3,485,879
SEPARATION OF ALCOHOLS FROM OLEFINIC AND PARAFFINIC HYDROCARBONS
Walter A. Mameniskis, Drexel Hill, Pa., and Thomas A. Washall, Claymont, Del., assignors to Atlantic Richfield Company, Philadelphia, Pa., a corporation of Pennsylvania
No Drawing. Filed June 19, 1967, Ser. No. 647,185
Int. Cl. C07c 29/24
U.S. Cl. 260—643                    2 Claims

ABSTRACT OF THE DISCLOSURE

An improved process for separating alcohols from $C_6$ to $C_{16}$ mixtures of alcohols and hydrocarbons boiling in the range of from about 155° F. to about 650° F. comprising contacting said mixture in the liquid phase with an active alumina adsorbent to selectively adsorb the alcohols thereon, contacting the adsorbent containing adsorbed alcohols and non-adsorbed residual hydrocarbons with a first solvent to displace the non-adsorbed residual hydrocarbons, contacting the adsorbent containing the adsorbed alcohols with an ether solvent to desorb said alcohols, and then washing the adsorbent with a second solvent at a temperature less than about 200° F. to remove the ether solvent thereby conditioning the active alumina for the next adsorption cycle.

BACKGROUND OF INVENTION

This invention relates to an improved method for recovering alcohols from hydrocarbon solutions. More particularly, this invention relates to the separation of alcohols from either paraffins or olefins and mixtures thereof. Still more particularly, this invention relates to the separation of alcohols having the characteristic formula R'OH wherein R' represents a saturated, unsubstituted branched or straight chain aliphatic or cycloaliphatic radical having from 6 to 16 carbon atoms, from either paraffins or olefins and mixtures thereof in a cyclic adsorption process wherein the requirement for thermal regeneration of the adsorbent bed is avoided.

The separation of alcohols from either paraffins or olefins and mixtures thereof having a wide boiling range or wide molecular weight range is an extremely difficult technical problem which has been investigated for a number of years. Although various prior art methods have appeared to have promising commercial possibilities, none of them has met with unqualified success. For example, alcohols have been removed from hydrocarbon mixtures by contacting the mixture with a solid adsorbent, e.g., an active alumina, silica gel, or the like, after which the alcohols are recovered from the adsorbent by elution with a highly polar solvent, such as for example, methanol. In these prior art processes, however, thermal regeneration of the adsorbent bed is required in order to remove the highly polar solvent.

In accordance with our invention we have now discovered a method whereby the alcohols can be separated from the hydrocarbons in a manner whereby thermal regeneration of the adsorbent is avoided. In accordance with our invention, regeneration of the adsorbent is accomplished in a manner which avoids the prior art thermal regeneration techniques and there results a more efficient and economical process.

SUMMARY OF INVENTION

In accordance with our invention a $C_6$ to $C_{16}$ mixture of alcohols and hydrocarbons such as for example, alcohols, olefins and paraffins is passed through an adsorption zone such as for example, a column containing an active alumina solid adsorbent. The alcohols characterized by the formula R'OH as previously defined, examples of which include hexanol-1, 2,2-dimethyl-butanol-3, cyclohexanol, octanol-1, 2-methyl-3-ethyl-pentanol-3, decanol-1, 2-ethyl-octanol-3 and cetylalcohol, etc. contained in the feed mixture are selectively adsorbed by the active alumina adsorbent. Following the introduction of the feed stream, the non-adsorbed residual hydrocarbons, i.e., the paraffins and/or olefins, are removed from the adsorbent bed by washing the bed with a first solvent. The alcohol is then recovered from the active alumina adsorbent by desorption utilizing an ether solvent. We have now discovered that the adsorbent bed can be non-thermally regenerated by washing said adsorbent with a second solvent in a non-thermal manner, where ether is used for the desorption step, to remove the ether solvent thereby conditioning the active alumina adsorbent for the next adsorption cycle.

It is therefore an object of our invention to provide an improved method for separating alcohols from hydrocarbons.

A further object of our invention is to provide an improved method for separating alcohols from either paraffins or olefins and mixtures thereof.

It is yet another object of our invention to provide a novel method for separating alcohols from hydrocarbons through means of a selective adsorption process with an active alumina adsorbent in a manner whereby the adsorbent can be non-thermally regenerated for reuse.

Other objects, advantages and features of our invention will be apparent to those skilled in the art without departing from the spirit and scope of our invention, and it should be understood that the latter is not necessarily limited to the accompanying discussion.

In a broad aspect, our invention relates to a process for selectively separating alcohols from $C_6$ to $C_{16}$ mixtures of alcohols and hydrocarbons boiling within the range of from about 155° F. to about 650° F. comprising contacting said mixture in the liquid phase with an active alumina adsorbent to selectively adsorb the alcohols thereon, contacting the adsorbent containing adsorbed alcohols and non-adsorbed residual hydrocarbons with a first solvent to displace said non-adsorbed residual hydrocarbons, contacting the adsorbent containing the adsorbed alcohols with an ether solvent to desorb said alcohols and thereafter contacting the adsorbent with a second solvent at a temperature less than about 200° F. to remove said ether thereby conditioning said active alumina adsorbent for the next adsorption cycle.

PREFERRED EMBODIMENT

In accordance with the method of our invention, a feed stream comprising $C_6$ to $C_{16}$ alcohols, paraffins and/or olefins is contacted with a solid active alumina adsorbent in an adsorption zone. The active alumina adsorbent selectively adsorbs the alcohols contained in the feed stream. The effluent from the adsorption zone therefore contains primarily the paraffins and olefins. The active alumina adsorbent is then contacted with a first solvent thereby removing the non-adsorbed residual paraffins and olefins from the adsorption zone. The alcohol fraction is then recovered by desorbing the active alumina adsorbent with an ether solvent. Following the desorption of the alumina adsorbent with the ether solvent, the adsorbent bed is then washed with a second solvent at a temperature less than about 200° F. in order to remove the ether and thereby conditioning the active alumina adsorbent for the next adsorption cycle.

The first and second solvents can be any suitable hydrocarbon having up to 20 carbon atoms. It is preferred, however, that the solvent be a paraffinic hydrocarbon, either iso-, cyclo-, normal or mixtures thereof. It is preferred that the solvent be either higher or lower boiling than the paraffins and olefins contained in the feed stream, in order to permit separation of the paraffins and olefins from the solvent thereby permitting reuse of the solvent in the process. Where the feed stream contains pure components, for example, $C_{10}$ paraffins, $C_{10}$ olefins and $C_{10}$ alcohols, the solvent can be either higher or lower boiling than the $C_{10}$ feed stream. Where the feed stream contains a mixture of paraffins, olefins and alcohols, for example, a $C_6$ to $C_{16}$ mixture, the solvent should have a boiling point range either higher or lower than the mid-boiling point of the $C_6$ to $C_{16}$ paraffins and olefins in the feed stream, preferably a boiling point below the $C_6$ substituent or a boiling point higher than the $C_{16}$ substituent. For example, in processing a feed stream containing $C_6$ to $C_{16}$ alcohols, paraffins and/or olefins boiling within the range of from about 155° F. to about 550° F. the following light paraffins or mixtures thereof can be employed; isopentane (B.P. 82° F.), n-pentane (B.P. 97° F.), 2,2-dimethylbutane (B.P. 122° F.), and 2,3-dimethylbutane (B.P. 136° F.). For the same feed, suitable heavy paraffin solvents would include normal, iso- and cyclo- paraffins or mixtures thereof boiling above 550° F.

Although the first and second solvent need not have the same composition, it is preferred for convenience of operation that the first solvent have the same composition as the second solvent.

The ether solvent used to remove the alcohol from the adsorbent must have a boiling point range lower than the boiling point of the lowest molecular weight alcohol in the feed. Further, although the ether and solvent can have the same boiling point range, it is preferred in order to permit separation of the ether solvent from the paraffinic solvent thereby permitting reuse of the ether solvent and paraffinic solvent, that the either solvent have either a higher boiling point range or lower boiling point range than the paraffinic solvent.

In summary, the choice of the ether solvent is dependent upon the boiling range of the paraffinic solvent, but must however, be lower boiling than the lowest molecular weight alcohol in the feed. For example, in the method of our invention if the feed stream contains $C_6$ to $C_{16}$ paraffins, olefins and primary alcohols and where the paraffinic solvent has a boiling point range of from about 115° F. to about 140° F. the following ethers and mixtures thereof are suitable: methyl-isopropyl ether (B.P. 91° F.) and diethyl ether (B.P. 95° F.) both of which are lower boiling than the paraffinic solvent and the lowest molecular weight alcohol in the feed. Also suitable are methyl-n-butyl ether (B.P. 160° F.), ethyl-iso-butyl ether (B.P. 174° F.), ethyl-n-butyl ether (B.P. 197° F.), di-sec-butyl ether (B.P. 250° F.), di-n-butyl ether (B.P. 250° F.) and similar compounds or mixtures thereof in the 160° F. to 290° F. boiling range. Thus it can be seen that lower alkyl ether solvents are suitable for use in the process.

Each of the above named higher boiling ethers (i.e., methyl-n-butyl ether, etc.) are higher boiling than the paraffinic solvent (B.P. range 115° F. to 140° F.) and lower boiling than the lowest molecular weight alcohol (1-hexanol B.P. 316° F.).

The operating pressure for each step in the process can vary from atmospheric pressure to super-atmospheric pressures, the only requirement being that the pressure be sufficient to maintain a reasonable flow of feed stream through the adsorbent bed.

The temperature employed is dependent upon the boiling ranges of the paraffins and olefins contained in the feed, and the boiling ranges of the paraffinic solvents and the ether solvent. For example, for a feed stock containing $C_6$ to $C_{16}$ paraffins, olefins and primary alcohols (B.P. range 155° F. to 650° F.) using a paraffinic solvent (B.P. range 115° F. to 140° F.) and either methyl-isopropyl ether (B.P. 91° F.) or diethyl ether (B.P. 95° F.) a suitable operating temperature range would be within the range of from about 70° F. to about 90° F. For the same feed using a paraffinic solvent (B.P. range 115° F. to 140° F.) and an ether solvent (B.P. range 160° F. to 290° F.) a suitable operating temperature range would be from about 70° F. to about 140° F. For the same feed but with a paraffinic solvent (B.P. greater than 500° F.) and an ether solvent (B.P. range 160° F. to 290° F.) a suitable temperature range would be from about 70° F. to about 290° F. It will be apparent, however, to those skilled in the art that in accordance with the method of our invention there is no need to operate the system at temperatures in excess of 200° F., since there is no need for thermal regeneration of the adsorbent.

The solid adsorbent used in the method of our invention is an active alumina adsorbent, i.e., an aluminum hydrate such as for example mono- and trihydrates, and alumina in gelatanous form having a proportion of free or loosely-held water associated with it which develops adsorptive properties (when activated by heating at relatively high temperatures such as those in the range of from about 480° F. to about 1475° F.), which does not adsorb the paraffins and olefins and which is selective for the adsorption of the alcohols. Various active alumina adsorbents which are commercially available can thus be used.

In order to more fully understand the method of our invention, reference is made to the following examples.

In examples an adsorption column having a volume of approximately 100 ml. and containing approximately 65 gms. of activated alumina was utilized.

Example I

The adsorbent was first pre-wet with n-pentane in order to condition the bed for Run 1. Ten grams of a feed stream comprising 50 weight percent n-$C_{12}$ paraffin and 50 weight percent of a mixture of $C_{10}$, $C_{12}$, $C_{14}$ and $C_{16}$ alcohols was then charged to the adsorbent bed. The bed was washed at 75° F. with 250 ml. of n-pentane in order to recover the paraffin. The bed was then washed with 250 ml. of diethyl ether at 75° F. in order to recover the alcohol. Finally 250 ml. of n-pentane was added at 75° F. to the adsorbent bed to remove the ether and condition the alumina for the next feed charge, i.e., Run 2. The pressure was maintained at about 14.7 p.s.i. Solvent was removed from both the paraffin and alcohol fractions by evaporation.

Six separate runs were made. The results of these runs is shown in Table I.

Example II

The procedure as set forth in Example I was repeated. However, the feed stream comprised 50 weight percent n-dodecene-1 and 50 weight percent of a mixture containing $C_{10}$, $C_{12}$, $C_{14}$ and $C_{16}$ alcohols. The results are shown in Table II.

Example III

The procedure as set forth in Example I is repeated. However, the feed stream comprised 50 weight percent n-hexane and 50 weight percent of a mixture containing $C_6$, $C_7$, $C_8$ and $C_9$ alcohols. The solvent and ether used in this example, and the results obtained are shown in Table III.

Example IV

The procedure as set forth in Example I is repeated. However, the mixture comprised 50 weight percent n-hexene and 50 weight percent of a mixture containing $C_6$, $C_7$, $C_8$ and $C_9$ alcohols. The solvent and ether used in this example, and the results obtained are shown in Table IV.

TABLE I.—SEPARATION OF PARAFFIN-ALCOHOL MIXTURES BY CYCLIC, ALUMINA ADSORPTION

| Run No. | Fraction recovered | Percent paraffin | Percent alcohol |
|---|---|---|---|
| 1 | Paraffin | 98.0 | 2.0 |
|   | Alcohol | 0.6 | 99.4 |
| 2 | Paraffin | 96.9 | 3.1 |
|   | Alcohol | 0.8 | 99.2 |
| 3 | Paraffin | 96.3 | 3.7 |
|   | Alcohol | 0.7 | 99.3 |
| 4 | Paraffin | 96.9 | 3.1 |
|   | Alcohol | 0.6 | 99.4 |
| 5 | Paraffin | 97.4 | 2.6 |
|   | Alcohol | 0.4 | 99.6 |
| 6 | Paraffin | 95.2 | 4.8 |
|   | Alcohol | 0.9 | 99.1 |

Charge 10 grams:    Solvent per pass
  50 wt. percent n-dodecane _____ 500 ml. n-pentane.
  50 wt. percent n - $C_{10}$—OH
    (4.5%); n-$C_{12}$—OH (50.5%);
    n-$C_{14}$—OH (17.2%); n-$C_{16}$
    —OH (27.8%) _____ 250 ml. diethyl ether.

Adsorbent: 65 grams of Alcoa alumina (F-20) having the following composition—

| Component: | Composition wt. percent |
|---|---|
| $Al_2O_3$ | 92.00 |
| $Na_2O$ | 0.90 |
| $Fe_2O_3$ | 0.08 |
| $SiO_2$ | 0.09 |
| Specific gravity | 3.3 |
| Particle size | 80–200 mesh |
| Surface area | 210 m. 2/g. |
| $H_2O$ loss on ignition | 6.20 |

TABLE II.—SEPARATION OF OLEFIN-ALCOHOL MIXTURES BY CYCLIC ALUMINA ADSORPTION

| Run No. | Fraction recovered | Percent olefin | Percent alcohol |
|---|---|---|---|
| 7 | Olefin | 97.5 | 2.5 |
|   | Alcohol | 0.7 | 99.3 |
| 8 | Olefin | 96.6 | 3.4 |
|   | Alcohol | 0.6 | 99.4 |
| 9 | Olefin | 97.3 | 2.7 |
|   | Alcohol | 0.5 | 99.5 |
| 10 | Olefin | 96.1 | 3.9 |
|    | Alcohol | 0.6 | 99.4 |
| 11 | Olefin | 96.2 | 3.8 |
|    | Alcohol | 0.6 | 99.4 |
| 12 | Olefin | 95.5 | 4.5 |
|    | Alcohol | 0.9 | 99.1 |

Charge 10 grams:    Solvent per pass
  50 wt. percent n-dodecene-1 ___ 500 ml. n-pentane.
  50 wt. percent n - $C_{10}$—OH
    (4.5%); n-$C_{12}$—OH (50.5%);
    n-$C_{14}$—OH (17.2%); n-$C_{16}$
    —OH (27.8%) _____ 250 ml. diethyl ether.

Adsorbent: 65 grams of Alcoa alumina (F-20) having the same composition as set forth in Table I.

TABLE III.—SEPARATION OF PARAFFIN-ALCOHOL MIXTURES BY CYCLIC, ALUMINA ADSORPTION

| Run No. | Fraction recovered | Percent paraffin | Percent alcohol |
|---|---|---|---|
| 13 | Paraffin | 98 | 2 |
|    | Alcohol | 0.6 | 99.4 |
| 14 | Paraffin | 97 | 3 |
|    | Alcohol | 0.8 | 99.2 |
| 15 | Paraffin | 96 | 4 |
|    | Alcohol | 0.7 | 99.3 |

Charge 10 grams:    Solvent per pass
  50 wt. percent n-hexane _____ 500 ml. n-dodecane.
  50 wt. percent n - $C_6$—OH
    (4.5%); n-$C_7$—OH (50.5%);
    n-$C_8$—OH (17.2%); n-$C_9$
    —OH (27.8%) _____ 250 ml. methyl-isopropyl ether.

Adsorbent: 65 grams of Alcoa alumina (F-20) having the same composition as set forth in Table I.

TABLE IV.—SEPARATION OF OLEFIN-ALCOHOL MIXTURES BY CYCLIC ALUMINA ADSORPTION

| Run No. | Fraction recovered | Percent olefin | Percent alcohol |
|---|---|---|---|
| 16 | Olefin | 97 | 3 |
|    | Alcohol | 0.7 | 99.3 |
| 17 | Olefin | 96 | 4 |
|    | Alcohol | 0.6 | 99.4 |

Charge 10 grams:    Solvent per pass
  50 wt. percent n-hexene-1 ____ 500 ml. n-dodecane.
  50 wt. percent n-$C_6$-OH
    (4.5%); n-$C_7$-OH (50.5%);
    n-$C_8$-OH (17.2%); n-$C_9$-OH
    (27.8%) _____ 250 ml. methyl-isopropyl ether.

Adsorbent: 65 grams of Alcoa alumina (F-20) having the same composition as set forth in Table I.

In the runs, for example, Runs 1-6, the same adsorbent bed was used. For example, after the regeneration of the adsorbent in Run 1 a feed stream was again passed to the adsorbent bed. It will be understood, however, by those skilled in the art that in the use of our invention there is no need to limit the operation to a single adsorbent bed, but multiple beds can be used so that while a first bed is being used for the adsorption of the alcohols from the feed stream, the second bed can be regenerated. In this manner, a cyclic process results which can continuously furnish an alcohol substantially free of paraffins and olefins.

As can be seen from the examples, the method of our invention provides an alcohol which is substantially free of paraffins and olefins.

The apparatus which can be used in carrying out the present invention is not critical. Any conventional equipment can be used. It is only necessary that the equipment be capable of withstanding the pressures and temperatures employed and that the equipment be designed in accordance with sound engineering practice.

From the foregoing description, it will be apparent that the present invention provides a method for separating alcohols from hydrocarbons in a manner which has not heretofore been employed. It will be understood that various modifications and alterations of the invention will become apparent and can be made by those skilled in the art without departing from the spirit and scope thereof, and that the specific details hereinabove set forth are purely illustrative.

Having thus described our invention, it should be understood that no undue limitations or restrictions are to be imposed by reason thereof.

We claim:
1. A process for separating alkanols from a $C_6$ to $C_{16}$ mixture of alkanols, paraffins and olefins boiling in the range of from 155° F. to 650° F. comprising the steps of:
    contacting said mixture in the liquid phase with an active alumina adsorbent to selectively adsorb the alkanols thereon,
    contacting the adsorbent containing adsorbed alkanols and non-adsorbed residual hydrocarbons with a first paraffin solvent selected from the group consisting of paraffins containing up to 20 carbon atoms having a boiling point above 550° F. and paraffins having a boiling point below 155° F. to displace said non-adsorbed residual hydrocarbons, contacting the adsorbent containing the adsorbed alkanols with a lower alkyl ether solvent, said ether solvent having a boiling point range lower than the boiling point of the lowest molecular weight alkanol in said mixture, to desorb said alkanols, and thereafter contacting the adsorbent with a second paraffin solvent selected from the group consisting of paraffins containing up to 20 carbon atoms having a boiling point above 550° F. and paraffins having a boiling point below 155° F. to remove said ether thereby conditioning said active alumina adsorbent for the next adsorption cycle all of said contacting taking place at a temperature of 70° to 200° F. and a pressure of at least one atmosphere.

2. A process according to claim 1 wherein the first and the second paraffin solvents have the same composition.

References Cited

UNITED STATES PATENTS

| | | |
|---|---|---|
| 2,619,497 | 11/1952 | Hockberger |
| 2,621,203 | 12/1952 | Cope. |
| 2,776,250 | 1/1957 | Capell et al. |
| 2,913,501 | 11/1959 | Cahill. |
| 3,308,170 | 3/1967 | Pritchott et al. |

OTHER REFERENCES

Vogel, "Practical Organic Chemistry," 3rd ed. (1957), pp. 159–162, 174.

Cassidy, "Adsorption and Chromatography" (1951) pp. 103, 112, 132, 133, 140–3, 152–5, 158, 159.

Lange, "Handbook of Chemistry," 6th ed. (1946), pp. 518–519.

LEON ZITVER, Primary Examiner

J. E. EVANS, Assistant Examiner

U.S. Cl. X.R.

260—631, 676, 677